United States Patent
McConville et al.

(10) Patent No.: US 9,684,716 B2
(45) Date of Patent: *Jun. 20, 2017

(54) VIDEO DISPLAY METHOD

(71) Applicant: Vdopia, Inc., Fremont, CA (US)

(72) Inventors: Ryan Patrick McConville, Brooklyn, NY (US); Bhupendra Singh, Uttar Pradesh (IN); Prashant Pandey, San Jose, CA (US); Chhavi Upadhyay, Fremont, CA (US); Srikanth Kakani, Fremont, CA (US)

(73) Assignee: VDOPIA, INC., Fremont, CA (US)

( * ) Notice: Subject to any disclaimer, the term of this patent is extended or adjusted under 35 U.S.C. 154(b) by 748 days.

This patent is subject to a terminal disclaimer.

(21) Appl. No.: 13/763,490

(22) Filed: Feb. 8, 2013

(65) Prior Publication Data

US 2013/0151934 A1    Jun. 13, 2013

Related U.S. Application Data

(62) Division of application No. 13/019,210, filed on Feb. 1, 2011.

(51) Int. Cl.
*H04N 7/10*      (2006.01)
*G06F 17/30*    (2006.01)
(Continued)

(52) U.S. Cl.
CPC .............. *G06F 17/30846* (2013.01); *H04N 21/234327* (2013.01); *H04N 21/234381* (2013.01);
(Continued)

(58) Field of Classification Search
CPC ... H04N 21/234336; H04N 21/234363; H04N 21/234381; H04N 21/440236; H04N 21/440263; H04N 21/440281
See application file for complete search history.

(56) References Cited

U.S. PATENT DOCUMENTS 5,132,992 A *  7/1992  Yurt ................. H04H 20/38
                                                   348/E5.002
5,459,830 A    10/1995  Ohba et al.
(Continued)

FOREIGN PATENT DOCUMENTS

KR       2005096625 A      10/2005

OTHER PUBLICATIONS

Office Action dated Jan. 14, 2013 in parent U.S. Appl. No. 13/019,210.
(Continued)

*Primary Examiner* — An Son P Huynh
(74) *Attorney, Agent, or Firm* — Haynes & Boone, LLP

(57) ABSTRACT

A method for video playback uses only resources universally supported by a browser ("inline playback") operating in virtually all handheld media devices. In one case, the method first prepares a video sequence for display by a browser by (a) dividing the video sequence into a silent video stream and an audio stream; (b) extracting from the silent video stream a number of still images, the number of still images corresponding to at least one of a desired output frame rate and a desired output resolution; and (c) combining the still images into a composite image. In one embodiment, the composite image having a number of rows, with each row being formed by the still images created from a fixed duration of the silent video stream. Another method plays the still images of the composite image as a video sequence by (a) loading the composite image to be displayed through a viewport defined the size of one of the still images; (b) selecting one of the still images of the composite image; (c) setting the viewport to display the selected still image; and (d) setting a timer for a specified time period based on a frame rate, such that, upon expiration of the specified time period: (i) selecting a next one of the still images to be
(Continued)

displayed in the viewport, unless all still images of the composite image have been selected; and (ii) return to step (c) if not all still images have been selected.

33 Claims, 6 Drawing Sheets

(51) Int. Cl.
| | | |
|---|---|---|
| *H04N 21/2343* | (2011.01) | |
| *H04N 21/414* | (2011.01) | |
| *H04N 21/43* | (2011.01) | |
| *H04N 21/431* | (2011.01) | |
| *H04N 21/4782* | (2011.01) | |
| *H04N 21/61* | (2011.01) | |
| *H04N 21/81* | (2011.01) | |
| *H04N 21/485* | (2011.01) | |

(52) U.S. Cl.
CPC ... *H04N 21/41407* (2013.01); *H04N 21/4307* (2013.01); *H04N 21/4316* (2013.01); *H04N 21/4782* (2013.01); *H04N 21/6125* (2013.01); *H04N 21/812* (2013.01); *H04N 21/8153* (2013.01); *H04N 21/4852* (2013.01)

(56) References Cited

U.S. PATENT DOCUMENTS

| | | | |
|---|---|---|---|
| 5,714,997 A | 2/1998 | Anderson | |
| 5,818,439 A | 10/1998 | Nagasaka et al. | |
| 6,081,551 A * | 6/2000 | Etoh | G06T 9/001 |
| | | | 375/240 |
| 6,185,363 B1 | 2/2001 | Dimitrova et al. | |
| 6,230,162 B1 | 5/2001 | Kumar et al. | |
| 6,304,174 B1 | 10/2001 | Smith et al. | |
| 6,654,541 B1 | 11/2003 | Nishi et al. | |
| 6,750,919 B1 | 6/2004 | Rosser | |
| 6,833,865 B1 | 12/2004 | Fuller et al. | |
| 6,870,573 B2 | 3/2005 | Yeo et al. | |
| 6,937,273 B1 | 8/2005 | Loui | |
| 7,313,808 B1 | 12/2007 | Gupta et al. | |
| 7,480,442 B2 * | 1/2009 | Girgensohn | G11B 27/034 |
| | | | 386/241 |
| 7,487,524 B2 | 2/2009 | Miyamori | |
| 7,594,177 B2 * | 9/2009 | Jojic | G06F 17/30852 |
| | | | 715/720 |
| 7,624,337 B2 | 11/2009 | Sull et al. | |
| 7,673,321 B2 * | 3/2010 | Yurt | H04H 20/40 |
| | | | 725/114 |
| 7,779,438 B2 | 8/2010 | Davies | |
| 7,810,049 B2 * | 10/2010 | Werwath | G06F 17/30899 |
| | | | 715/838 |
| 7,836,475 B2 * | 11/2010 | Angiolillo | H04N 7/17318 |
| | | | 725/47 |
| 7,853,898 B2 * | 12/2010 | Clark | G06F 17/30274 |
| | | | 715/811 |
| 7,996,791 B2 | 8/2011 | Rashkovskiy | |
| 7,996,878 B1 | 8/2011 | Basso et al. | |
| 8,079,054 B1 | 12/2011 | Dhawan et al. | |
| 8,117,564 B2 | 2/2012 | Woods et al. | |
| 8,223,849 B2 | 7/2012 | Lu et al. | |
| 8,307,395 B2 | 11/2012 | Issa et al. | |
| 8,578,273 B2 * | 11/2013 | MacKenzie | G06F 3/04845 |
| | | | 715/730 |
| 2001/0005400 A1 * | 6/2001 | Tsujii | G11B 27/11 |
| | | | 375/240.29 |
| 2001/0043794 A1 * | 11/2001 | Akiba | G11B 27/102 |
| | | | 386/239 |
| 2002/0062313 A1 * | 5/2002 | Lee | H04H 20/42 |
| 2002/0144262 A1 | 10/2002 | Plotnick et al. | |
| 2004/0019608 A1 * | 1/2004 | Obrador | G06F 17/30044 |
| 2004/0042766 A1 * | 3/2004 | Mizushiri | G11B 19/025 |
| | | | 386/241 |
| 2004/0150723 A1 | 8/2004 | Seo et al. | |
| 2004/0197088 A1 | 10/2004 | Ferman et al. | |
| 2005/0044499 A1 * | 2/2005 | Allen | G06F 17/30038 |
| | | | 715/704 |
| 2005/0062888 A1 * | 3/2005 | Wood | H04N 5/775 |
| | | | 348/553 |
| 2005/0281535 A1 | 12/2005 | Fu et al. | |
| 2007/0058937 A1 * | 3/2007 | Ando | G11B 27/105 |
| | | | 386/248 |
| 2007/0067305 A1 * | 3/2007 | Ives | G06F 17/30864 |
| 2007/0147706 A1 * | 6/2007 | Sasaki | H04N 5/23248 |
| | | | 382/295 |
| 2007/0168864 A1 | 7/2007 | Yamamoto et al. | |
| 2007/0203942 A1 | 8/2007 | Hua et al. | |
| 2007/0250901 A1 | 10/2007 | McIntire et al. | |
| 2007/0268406 A1 * | 11/2007 | Bennett | H04N 7/0122 |
| | | | 348/565 |
| 2007/0274672 A1 * | 11/2007 | Itoi | H04N 9/7921 |
| | | | 386/241 |
| 2008/0154941 A1 * | 6/2008 | Park | H04N 21/2343 |
| 2009/0021592 A1 * | 1/2009 | Oyama | H04N 5/23293 |
| | | | 348/220.1 |
| 2009/0158326 A1 * | 6/2009 | Hunt | G06F 3/04817 |
| | | | 725/38 |
| 2010/0091184 A1 * | 4/2010 | Nitta | H04N 5/772 |
| | | | 348/448 |
| 2010/0158109 A1 * | 6/2010 | Dahlby | H04N 7/17318 |
| | | | 375/240.03 |
| 2010/0262280 A1 * | 10/2010 | Miller | G07F 9/02 |
| | | | 700/234 |

OTHER PUBLICATIONS

Final Office Action dated Apr. 29, 2013 in parent U.S. Appl. No. 13/019,210.

* cited by examiner

VIDEO DISPLAY METHOD

REFERENCE TO RELATED APPLICATIONS

This application is a division of U.S. patent application Ser. No. 13/019,210, filed on Feb. 1, 2011, which is hereby incorporated by reference in its entirety.

BACKGROUND OF THE INVENTION

1. Field of the Invention

The present invention relates to handheld mobile devices. In particular, the present invention relates to playing video on a handheld mobile device.

2. Discussion of the Related Art

Video advertising is an important vehicle for promoting a product or a service on television, on-line devices or mobile devices. It is anticipated that video advertising will be equally important in the coming Internet-enabled television applications. However, current hand-held media devices (e.g., iPad, iPhone, Android devices) implement the HTML5 specification in so many different ways as to make it difficult for video advertising providers to provide a standard method for delivering video advertising. Specifically, because most hand-held media devices play video only in native mode, playing a video embedded in a web page is accomplished only by suspending the browser application and transferring control to a native media player. The file formats expected by the native media players vary among the handheld media devices. Therefore, it is difficult for a website owner to embed on a webpage a video clip that can be played by a large number of hand-held media devices. Further, the user is required to activate a link to start the native media player. Thus, support for video advertising in current handheld media devices is unsatisfactory.

SUMMARY

The present invention provides a method for video playback using only resources universally supported by a browser ("inline playback") operating in virtually all hand-held media devices. Such a video display method is particularly valuable because it enables video playback even on browsers with limited capabilities. Such a method is particularly beneficial to video advertising on mobile media devices, without requiring complex codecs.

According to one embodiment of the present invention, a method prepares a video sequence for display by a browser. The method includes (a) dividing the video sequence into a silent video stream and an audio stream; (b) extracting from the silent video stream a number of still images, the number of still images corresponding to at least one of a desired output frame rate and a desired output resolution; and (c) combining the still images into a composite image. In one embodiment, the composite image having a number of rows, with each row being formed by the still images created from a fixed duration of the silent video stream.

According to one embodiment of the present invention, the method for preparing a video sequence for display by a browser further comprises applying heuristic algorithms to the composite image to facilitate smooth video playback.

According to one embodiment of the present invention, the method for preparing a video sequence for display by a browser further comprises compressing the composite image, using one or more pf JPEG- and Huffman-based compression algorithms.

According to one embodiment of the present invention, a method plays a composite image of the present invention, which includes a number of still images as a video sequence. The method comprises: (a) loading the composite image to be displayed through a viewport defined the size of one of the still images; (b) selecting one of the still images of the composite image; (c) setting the viewport to display the selected still image; and (d) setting a timer for a specified time period based on a frame rate, such that, upon expiration of the specified time period: (i) selecting a next one of the still images to be displayed in the viewport, unless all still images of the composite image have been selected; and (ii) return to step (c) if not all still images have been selected.

According to one embodiment of the present invention, the method which plays the composite image as a video sequence has the still images arranged in a multiple-row array. In that embodiment, each row of the multiple-raw array is formed by still images obtained from a video sequence, the number of still images in each row being related to a fixed time duration.

According to one embodiment of the present invention, the method which plays the composite image as a video sequence synchronizes setting of the selected still image for display with an audio stream.

According to one embodiment of the present invention, the method which plays the composite image as a video sequence may be implemented as an add-on to a web browser. Such an add-on may be implemented by a script written in an industry standard scripting language, such as javascript.

In one embodiment of the present invention, the video sequence is played when a user of an internet-enabled device makes a selection from a web page displayed on a graphical display. The selection may be made by clicking on an icon, such as a mute button.

The methods of the present invention allow a video advertising vendor to offer a standard and scalable method to a website owner to display video advertising on any web browser, regardless of the native format adopted by the handheld media player. Consequently, a network is created to enable running video advertising across many handheld media devices.

The present invention is better understood upon consideration of the detailed description below and the accompanying drawings.

BRIEF DESCRIPTION OF THE DRAWINGS

FIG. 2 represents specifying a still image to be displayed in a viewport by a playback module implementing a method of the present invention.

DETAILED DESCRIPTION OF THE
PREFERRED EMBODIMENTS

Figure 6:
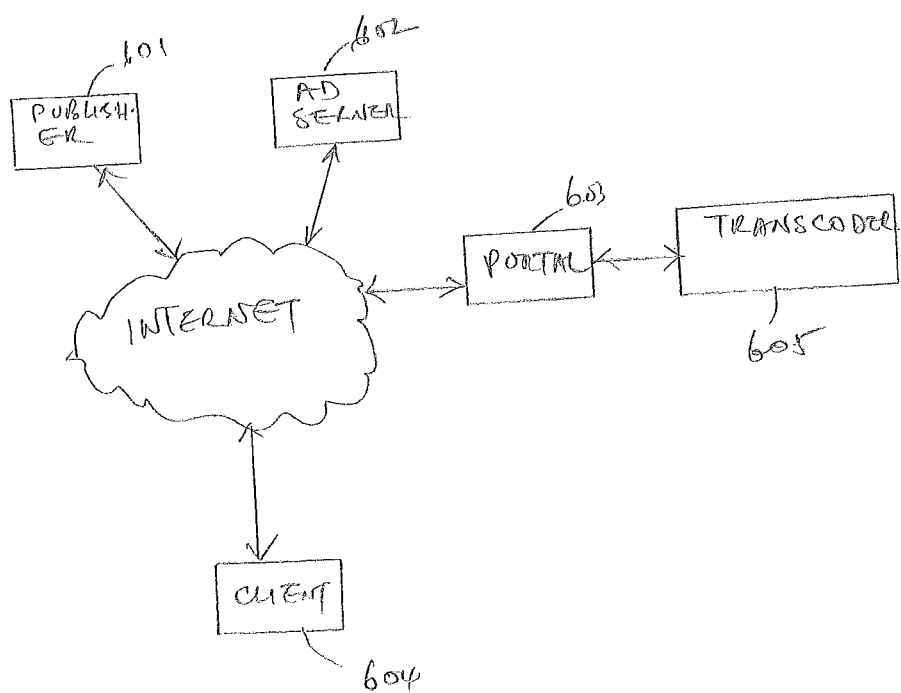
FIG. 6 provides exemplary system 600, in accordance with one embodiment of the present invention.

Although this detailed description is provided in the context of video advertising, the present invention is applicable to displaying any video format data. FIG. 6 provides exemplary system 600, in accordance with one embodiment of the present invention. As shown in FIG. 6, an advertising or campaign manager at an advertising company uploads a typical 16×9, or a 4×3 video sequence for use in advertising on to an advertising portal site 603. As known to those skilled in the art, a video sequence is a group of images (frames) to be played at a specified frame-rate; most video sequences also include a synchronized audio stream. A video sequence that is played on a mobile hand-held media device is typically played at 15 frames per second at a frame rate and a 480×272 (i.e., 16×9 aspect ratio) resolution, and 192 kbps sound. A typical video sequence used for advertising may be 10-15 seconds long. The advertising or campaign manager may provide further information, such as site targeting and other targeting parameters (e.g., the type of websites to run the advertising, and how frequent it should be run).

Figure 1:
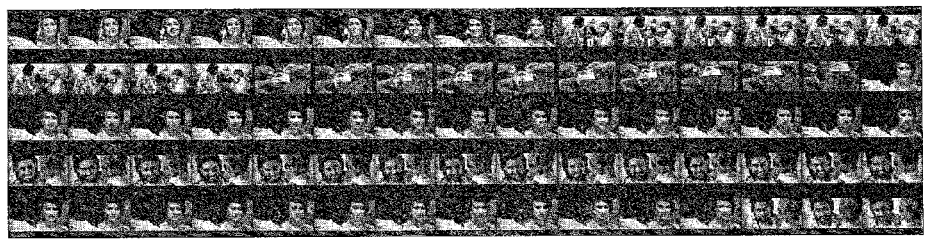
FIG. 1 shows a composite image formed by still images extracted from four seconds of a video stream, at a frame rate of 15 frames per second, in accordance with one embodiment of the present invention.

Portal site 603 provides transcoder module 605 which re-encodes the uploaded video into a playback-friendly format (described below). Transcoder module 605 performs the following steps:

1. Dividing the video sequence into a silent video stream and an audio stream;

2. Separately storing the audio stream into a separate file;

3. Extracting from the silent video stream a number of still images, the number of still images to provide is determined by the desired output frame-rate and the desired output resolution;

4. Combining the still images into a composite image consisting of a number of rows, each row being formed by the still images created from a one-second segment of the silent video stream (FIG. 1 shows a composite image formed by still images extracted from four seconds of a video stream, at a frame rate of 15 frames per second, in accordance with one embodiment of the present invention)

5. (optional) Applying heuristic algorithms to the composite image aimed at ensuring smooth video playback (e.g., compiling an index of the still images in the composite image, so as to facilitate calculating each still image's position during playback); and 6. (optional) Compressing the composite image, using one or more JPEG- or Huffman-based compression algorithms (e.g., any suitable compression algorithm that takes advantage of the scenic similarity that exists between successive frames).

Figure 4:
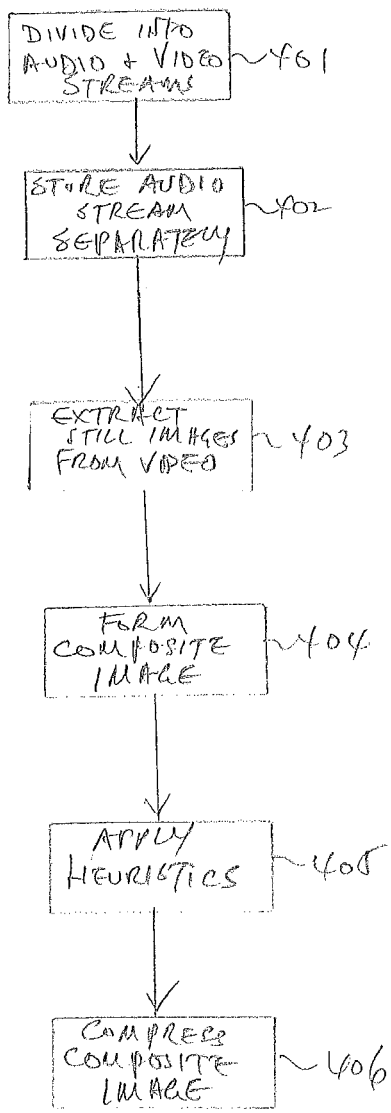
FIG. 4 shows flow chart 400, which summarizes steps 1-6 of a transcoder of the present invention described herein as steps 401-406.

These steps are summarized as steps 401-406 in flow chart 400 of FIG. 4.

Having thus processed, the composite image is made accessible to advertising servers (e.g., advertising server 602), which serves advertising content to websites (e.g., publisher sites 601) conforming to the targeting parameters. For example, when a user (e.g., client 604) requests a web page from publisher server 601, publisher server 601 embeds in the requested web page, code for requesting an advertising company's server (e.g., advertising server 602) for advertising content. Upon receiving the web page, client 604 sends the embedded request to advertising server 602, which selects one or more composite images from its collection of composite images based on the targeting parameters. Advertising server 602 then sends the selected composite images to client 604 with specific playback instructions. In one application ("VDO", indicating playback of video according to a method of the present invention), the playback instructions include frame-size (video resolution), frame-rate, the universal resource locators (URLs) of the composite images, and the display-size. In the example of FIG. 6, communication between various parties take place over the internet. In some embodiments, some communication may take place over one or more private networks. Also, variations and modification of the protocols (e.g., interactions between advertising server 602 and publisher server 601) discussed above are possible.

In one embodiment, transcoder 605 may detect motion in the video sequence and provide a composite image that is to be played back using multiple frame rates (i.e., a less frame rate for relatively still scenes, and a higher frame rate where motion is detected. In that embodiment, the frame rate information is provided to the playback module along with the composite image.

By dividing a given video sequence into video and audio streams (synchronizing the two streams during playback on the client side) to be separately processed, allows a playback module (described below) to be simply implemented using a scripting language, e.g. Javascript code. This simple approach reduces the overall integration time for incorporating video advertising into a web page to mere minutes, instead of months. Using a frame-by-frame approach, the transcoding module the present invention therefore takes advantage of a frame-based delivery approach, which allows keeping related frames together to achieve high compression.

A playback module written in a suitable script language (e.g., a script language supported by most (if not all) browsers, such as javascript codes) may be provided to the user's browser. The playback module processes the composite images produced by the transcoder module. The playback module also manages buffering to deliver a continuous video experience using the component still images in the composite images. The playback module performs the following steps:

1. Loading the first composite image with a viewport defined by the frame-size, such that at any given time, only a still image worth of the composite image is displayed in the viewport;

2. setting the portion of the composite image to be displayed in the viewport to the first still image of the composite image (e.g., the upper left still image, with an index value of 0);

3. setting a timer to instruct the browser to call back the playback module after a specified time, the specified time being the time interval defined by the frame-rate;

4. (entry point) setting the portion of the composite image to be displayed in the viewport, if available, to the next still image of the composite image (e.g., the still image in the composite image to the right of the one currently being displayed, or the image having the next greater index);

5. (optional) Synchronizing the next still image, if available, to be displayed with the audio stream; and 6. If the next still image is available, return to step 3 above.

Figure 5:
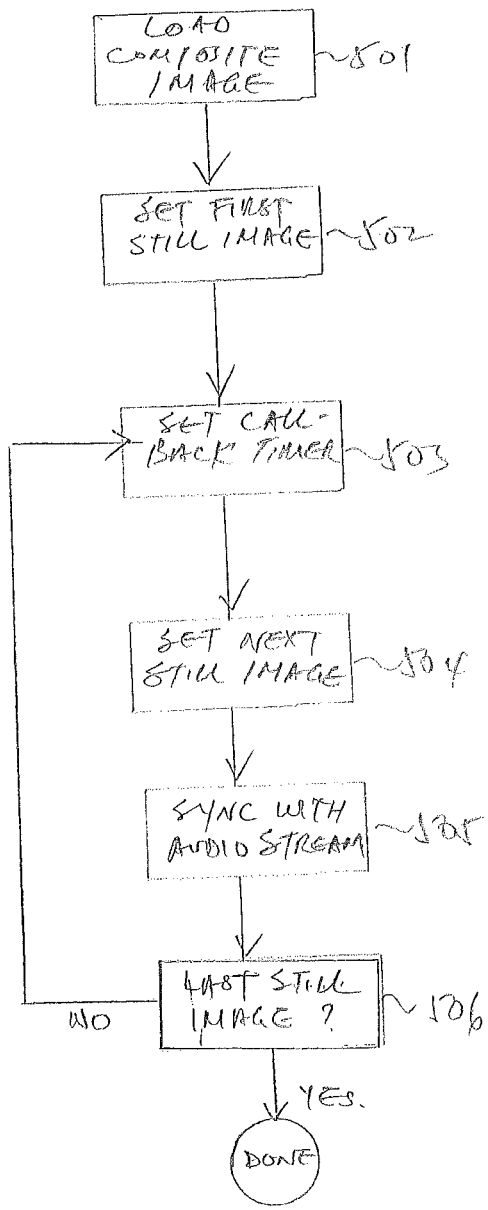
FIG. 5 shows flow chart 500, which summarizes steps 1-6 of a playback module of the present invention described herein as steps 501-506.

These steps are summarized in FIG. 5 by flow chart 500, showing steps 1-6 of the playback module described herein as steps 501-506.

These sequence of steps cause the browser to display the specified still images to be displayed one by one, with each successive still image being displayed for the time period defined by the frame rate, thus achieving a video effect within the browser without invoking the native player on the handheld media device. In one embodiment, where the video is to be played using variable-rate playback, for each still image, the timer is set to its corresponding frame rate, which may change from still image to still image.

Figure 2:
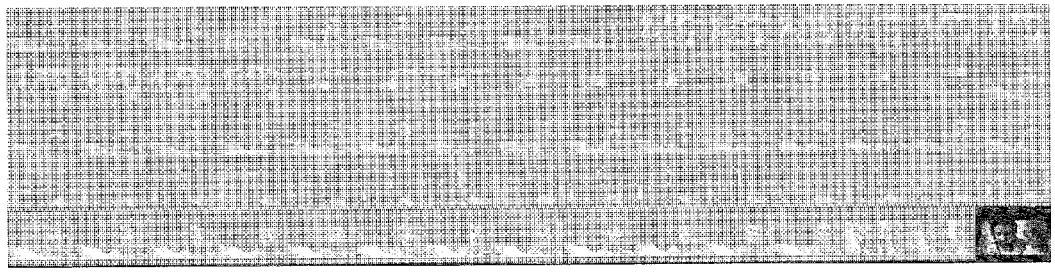
FIG. 2 shows the composite image of FIG. 1, with all component still images "greyed out" except for one.

FIG. 2 shows the composite image of FIG. 1, with all component still images "greyed out" except for one; FIG. 2 represents specifying a still image to be displayed in a viewport by a playback module implementing a method of the present invention. Although this example shows the component still images of the composite image being arranged in a rectangular array in an implicit order, such an arrangement is not necessary. For example, the component still images in the composite image may be arranged in any manner. In one embodiment, indexing information may be provided using a separate file, or through javascript.

The composite image may be composed from or more layers of images. The layers are drawn in proper order to form the final image which is shown to user as a frame. Such an approach enhances data compression and further reduces the total amount of image data transferred. For example, each frame may be decomposed into a portion identical to another frame (the "base frame") and one or more component layers each representing an incremental change in scene from the base frame. Typically the incremental change in scene may be provided using much fewer bits than the base frame, which needed to be sent only once for the many frames that may depend from the base frame.

The method above can also be implemented using the "Canvas" element under the HTML5 standard, although "Canvas" is not as supported on all mobile browsers. In that implementation, a still image to be displayed in the viewport is rendered into a bitmap ("drawn") and copied into the canvas using appropriate application program interface (API) calls every time the timer expires. In some embodiments, the bitmap is a data structure at a specified location in memory.

Figure 3:
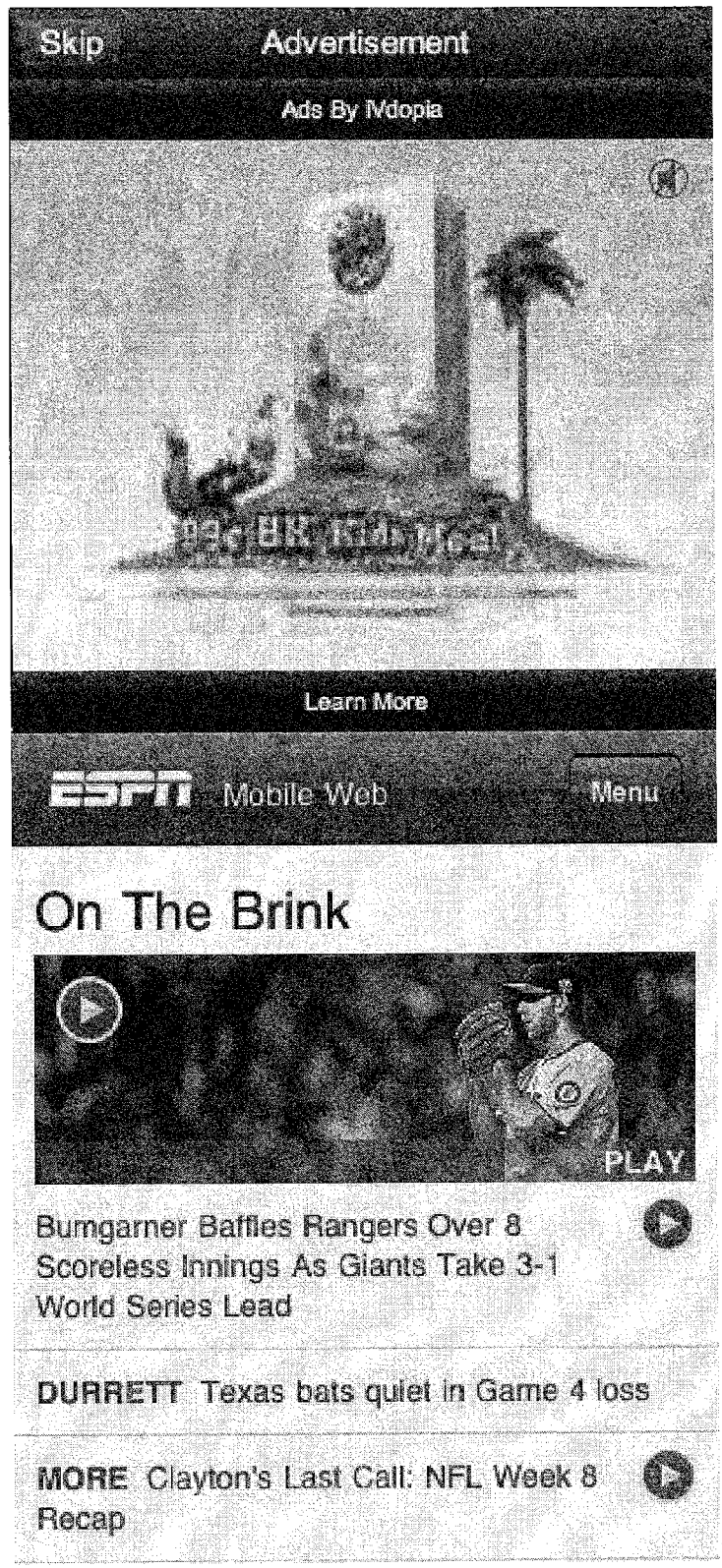
FIG. 3 shows a mute button provided during the replay of video in accordance with one embodiment of the present invention.

Optionally, the playback module can implement a mute button (FIG. 3), so that the user may elect to play the video without the audio stream. In one embodiment, the mute button allows the user to choose playing the original video with sound in fullscreen (as supported by most devices). The mute button provides a click context that enables the playback module to play the video automatically thereby ensuring a desirable browsing experience.

Figure 7:
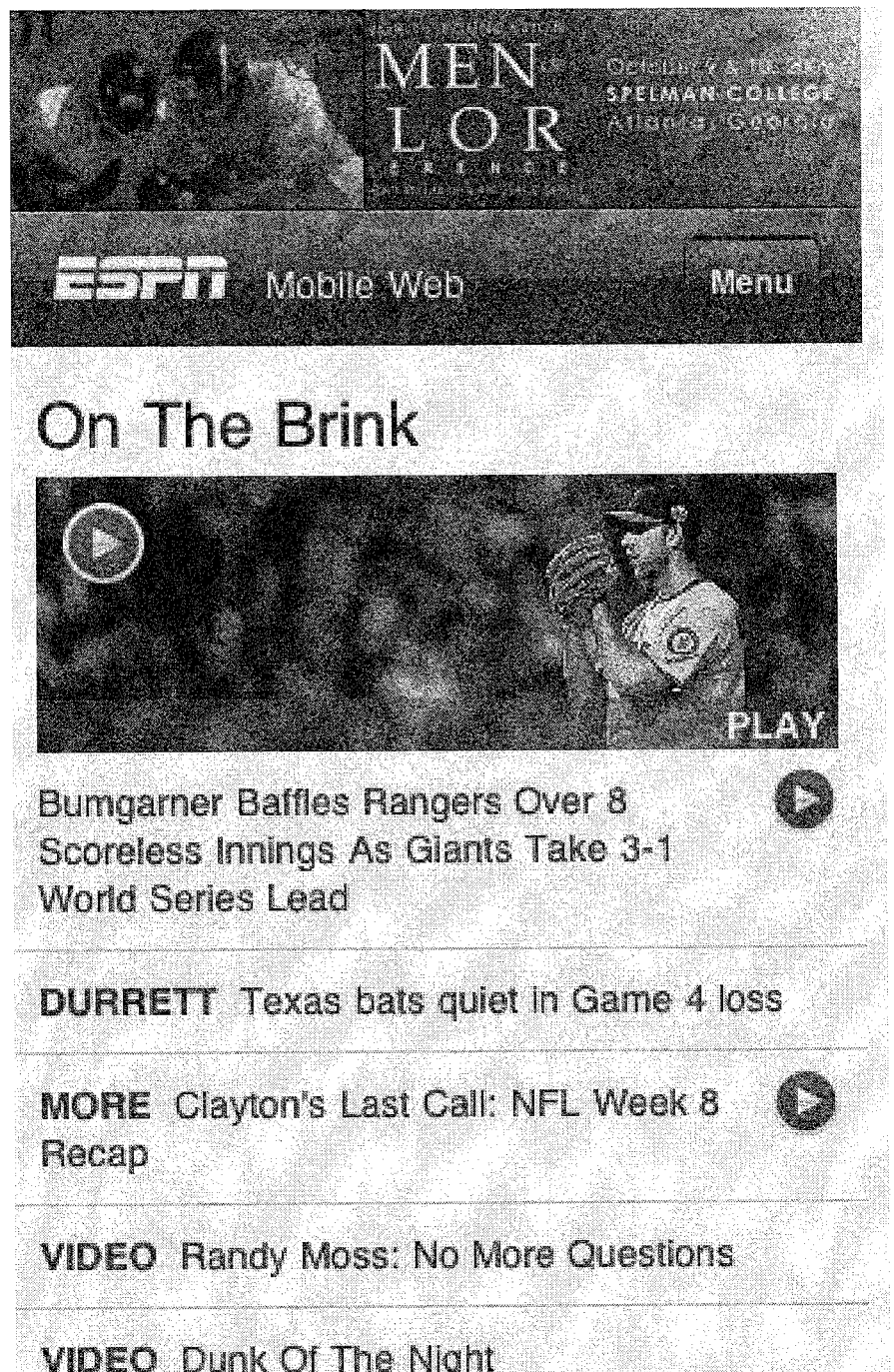
FIG. 7 shows, in one embodiment, a video sequence being played within a viewport placed at the top of a web page where a "banner" is conventionally displayed.

In addition, the viewport for displaying the video sequence according to the present invention may be placed anywhere on the display of the media player. In one embodiment, as shown in FIG. 7, the video sequence can be shown within a viewport placed at the top of a web page where a "banner" is conventionally displayed.

An exemplary playback module written in javascript is provided below to illustrate the techniques described above:

```
<html>
<head>
<meta name="viewport" content="width=device-width; initial-scale=1.0; maximum-scale=1.0; user-scalable=0;"/>
<title>iVdopia WAP ads demo</title>
<link rel="canonical" href="http://www.ivdopia.com">
</head>
<body>
<div id='video' style='background-image: url(final.0.png); background-position:0px 0px;
width:320; height:180;' ><a onclick='document.getElementById("myAudio").play( );'><img
src='muteicon.png'/></a><audio id="myAudio" src="audio.mp3" muted=true
></audio></img></div>
<!--div id='log'></div-->
<script>
var framerate=12;
var totalImages=16;
var totalFrames=2*totalImages*framerate;
var runUpto=totalFrames;
var width=320;
var height=180;
var currentFrame=0;
var totallines=Math.ceil(totalFrames/framerate);
var linesPerFile=Math.ceil(totallines/totalImages);
var framesPerFile=Math.ceil(totalFrames/totalImages);
var currFile=0;
var video=document.getElementById('video');
var log=document.getElementById('log');
var debugLog=function(str) {
if(log) log.innerText+=str+"\n";
}
debugLog(totallines+" " + linesPerFile + " " + totalFrames );
var precache=function( ) {
for(i=1;i<totalImages;i++) {
var image=document.createElement('img');
image.src='final.'+i+'.png';
debugLog(image.src);
}
}
var videoPlayback=undefined;
var autoPlayVideo=function( ) {
videoPlayback=setInterval(function( ) {
currentFrame=currentFrame+1;
if(currentFrame>=runUpto) {
```

-continued

```
clearInterval(videoPlayback);
videoPlayback=undefined;
return;
}
showFrame(currentFrame);
}, 1000/framerate);
}
var showFrame=function(currFrame) {
var currFile=Math.floor((currFrame-1)/framesPerFile);
currX=width*((currFrame-1)%framerate);
currY=height*Math.floor(((currFrame-1)/framerate)-(linesPerFile*currFile));
debugLog(currFrame+" " + currX+ " " + currY + " " +currFile + " " +linesPerFile);
video.style['background-position']='-'+currX+'px -'+currY+'px';
if(video.style['background-image']!='url(final.'+currFile+'.png)') {
video.style['background-image']='url(final.'+currFile+'.png)';
}
currentFrame=currFrame;
}
precache( );
var audio=document.getElementById("my Audio");
autoPlayVideo( );
var setCurrentTime=undefined;
audio.addEventListener('timeupdate',function( ) {
debugLog("CurrentTime "+this.currentTime);
/*if(setCurrentTime==undefined) {
setCurrentTime=true;
this.currentTime=currentFrame/framerate;
}*/
if(videoPlayback==undefined) {
autoPlayVideo( );
}
showFrame(Math.floor(this.currentTime*framerate));
});
</script>
</body>
</html>
```

The present invention is applicable to all mobile or on-line websites, applications and other video content (e.g., television). The handheld devices that can benefit from the present invention includes all possible electronic devices capable of connecting to the internet and displaying advertising, such as Personal Computer, Notebook, iPad, iPod, iPhone, Android Devices, BlackBerry Devices, Television, and Internet Enabled Television.

The above detailed description is provided to illustrate specific embodiments of the present invention and is not intended to be limiting. Numerous variations and modifications within the scope of the present invention are possible. The present invention is set forth in the accompanying claims.

We claim:

1. A method comprising:
   requesting, by a mobile device, a web page from a first server, the web page including an identification of content located on a second server;
   requesting, by the mobile device, the identified content from the second server;
   receiving, by the mobile device, in response to the request for the identified content from the second server, a configuration script, an audio file, and a composite image as separate files, the composite image comprising a plurality of still images obtained from a video sequence and arranged in a multiple row and multiple column array, the audio file comprising audio extracted from the video sequence, the mobile device including a processor;
   creating, by the processor, a viewport, the viewport being embedded in the web page, wherein dimensions of the viewport are equal to dimensions of a first still image of the plurality of still images;
   displaying the first still image in the viewport by copying the first still image as a bitmap onto a canvas;
   starting a timer with a duration based on a frame rate between the first still image and a second still image of the plurality of still images to follow the first still image;
   in response to the timer timing out, automatically displaying the second still image in the viewport by copying the second still image as a bitmap onto the canvas;
   repeating starting of the timer with the duration based on one or more frame rates included in the configuration script and displaying of the plurality of still images including displaying each of the plurality of still images in the viewport in sequence; and
   synchronizing and playing the audio file concurrently with the displaying of each of the plurality of still images, wherein each of the plurality of still images is displayed according to the one or more frame rates;
   wherein:
     each complete row of the composite image is created from a fixed duration of the video sequence; and
     the displaying of each of the plurality of still images uses only resources supported by a web browser on the mobile device and does not invoke a native video player on the mobile device.

2. The method of claim 1, wherein the viewport is placed within a banner on the web page.

3. The method of claim 1, wherein creating the viewport comprises specifying a position of the first still image in the composite image.

4. The method of claim 1, wherein creating the viewport comprises drawing the first still image into a designated memory location.

5. The method of claim 1, wherein each of the plurality of still images is displayed according to an index attached to the composite image.

6. The method of claim 1, wherein each of the plurality of still images is displayed by specifying a current position within the composite image.

7. The method of claim 1, wherein the method is carried out by an add-on to the web browser.

8. The method of claim 1, wherein the configuration script is written in an industry standard scripting language.

9. The method of claim 8, wherein the industry standard scripting language is JavaScript.

10. The method of claim 1, further comprising executing, by the processor, the configuration script and wherein the mobile device comprises one of: a personal computer, a notebook computer, a tablet computer, a personal digital assistance, a media player, a mobile telephone, and an internet-enabled television.

11. The method of claim 10, wherein the method is carried out when a user of the mobile device makes a selection from a previously received web page, the previously received web page being displayed using the web browser.

12. The method of claim 11, wherein the selection is made by clicking on an icon.

13. The method of claim 12, wherein the icon comprises a mute button.

14. The method of claim 1, wherein the composite image is received as a compressed image.

15. The method of claim 1, wherein the composite image includes a plurality of layers of still images.

16. The method of claim 1, wherein the one or more frame rates are based on a level of motion in the content.

17. A media player, comprising:
a graphical display;
an interface to a wide area network; and
a mobile device, including a processor to:
request a web page from a first server;
receive, in response to the request for the web page from the first server, a configuration script, an audio file, and a composite image as separate files, the composite image comprising a plurality of still images obtained from a video sequence and arranged in a multiple row and multiple column array, the audio file comprising audio extracted from the video sequence;
create a viewport, the viewport being embedded in the web page, wherein dimensions of the viewport are equal to dimensions of a first still image of the plurality of still images;
display, by using the graphical display, the first still image in the viewport by copying the first still image as a bitmap onto a canvas;
start a timer with a duration based on a frame rate between the first still image and a second still image of the plurality of still images to follow the first still image;
in response to the timer timing out, automatically display the second still image in the viewport by copying the second still image as a bitmap onto the canvas;
repeat starting of the timer with the duration based on one or more frame rates included in the configuration script and displaying of the plurality of still images including displaying each of the plurality of still images in the viewport in sequence; and
synchronize and play the audio file concurrently with the displaying of each the plurality of still images, wherein each of the plurality of still images is displayed according to the one or more frame rates;
wherein:
each complete row of the composite image is created from a fixed duration of the video sequence; and
the displaying of each of the plurality of still images uses only resources supported by a web browser on the mobile device and does not invoke a native video player on the mobile device.

18. The media player of claim 17, wherein the viewport is placed within a banner on the web page.

19. The media player of claim 17, wherein the processor further creates the viewport by specifying a position of the first still image in the composite image.

20. The media player of claim 17, wherein the processor further creates the viewport by drawing the first still image into a designated memory location.

21. The media player of claim 17, wherein each of the plurality of still images is displayed in order from row to row and column to column along a predetermined direction.

22. The media player of claim 17, wherein each of the plurality of still images is displayed according to an index attached to the composite image.

23. The media player of claim 17 wherein each of the plurality of still images is displayed by specifying a current position within the composite image.

24. The media player of claim 17, wherein the displaying and synchronizing are performed by an add-on to the web browser.

25. The media player of claim 24, wherein the configuration script is written in an industry standard scripting language.

26. The media player of claim 25, wherein the industry standard scripting language is JavaScript.

27. The media player of claim 17, wherein the processor further requests the web page from the first server when a user of the media player makes a selection from a previously displayed web page using the web browser.

28. The media player of claim 27, wherein the selection is made by clicking on an icon.

29. The media player of claim 28, wherein the icon comprises a mute button.

30. The media player of claim 17, wherein the processor further receives the composite image as a compressed image.

31. The media player of claim 17, wherein the composite image includes a plurality of layers of still images.

32. The media player of claim 17, wherein the web page includes an identification of content located on a second server, and the processor further requests the identified content from the second server.

33. The media player of claim 17, wherein the one or more frame rates are based on a level of motion in the content.

* * * * *